United States Patent [19]

Cone

[11] Patent Number: 5,229,149
[45] Date of Patent: Jul. 20, 1993

[54] STRAWBERRY SIMULATING A ROSE BUD

[76] Inventor: Shari L. Cone, 6207 Antares Way, Orangevale, Calif. 95662

[21] Appl. No.: 724,740

[22] Filed: Jul. 2, 1991

[51] Int. Cl.$^5$ .................. A23G 1/00; A23G 3/00; A23L 1/212

[52] U.S. Cl. .................. 426/91; 426/90; 426/102; 426/103; 426/104; 426/132; 426/134; 426/106; 426/124

[58] Field of Search .............. 426/104, 102, 103, 803, 426/132, 90, 91, 134; 428/24–26; D11/117–120; D1/106, 115

[56] References Cited

U.S. PATENT DOCUMENTS

| | | | |
|---|---|---|---|
| D. 289,220 | 4/1987 | Dowdy et al. | D11/117 |
| D. 315,294 | 3/1991 | Young et al. | D11/117 |
| 982,461 | 1/1911 | Becker | 426/104 |
| 1,238,110 | 8/1917 | Coolidge | 426/104 |
| 1,468,743 | 3/1923 | Porter | |
| 1,545,463 | 7/1925 | Dreyer | 426/104 |
| 1,595,449 | 8/1926 | Carrm | D11/118 |
| 1,629,531 | 5/1927 | Reisert | 428/24 |
| 1,715,461 | 6/1929 | Loeben | 428/24 |
| 1,831,559 | 11/1931 | Ham et al. | 428/26 |
| 1,858,148 | 5/1932 | Freese | 428/24 |
| 1,911,983 | 5/1933 | Addis et al. | 428/26 |
| 1,958,257 | 5/1934 | Addis et al. | 428/24 |
| 2,075,327 | 3/1937 | Abrams et al. | 428/24 |
| 2,204,037 | 6/1940 | Fernbatch | D11/117 |
| 2,514,177 | 7/1950 | Brown | 428/24 |
| 2,552,274 | 5/1951 | Gentile | 428/24 |
| 2,565,700 | 8/1951 | Schiller | D11/118 |
| 2,651,130 | 9/1953 | Stratmann | 426/104 |
| 2,694,644 | 11/1954 | Knab | 428/24 |
| 2,698,802 | 1/1955 | Boon | 426/104 |
| 3,039,220 | 6/1962 | Fristot | 428/26 |
| 3,041,766 | 7/1962 | Decamp | 428/24 |
| 3,137,610 | 6/1964 | Flynn | 428/26 |
| 3,144,932 | 8/1964 | Zerbo | 428/24 |
| 3,793,126 | 2/1974 | McAdams | 428/24 |

OTHER PUBLICATIONS

Swiss Colony Christmas Gift Book 1982.
Goodhousing, Complete Book of Cake Decorating p. 83 1961.
Dennison, How to Make Flowers 1948 pp. 1–38.

*Primary Examiner*—Steven Weinstein
*Attorney, Agent, or Firm*—Joseph E. Gerber

[57] ABSTRACT

A strawberry rose comprised of a stalk portion and a head portion combined to appear to be a long-stemmed rose bud is disclosed. The stalk portion includes a rigid elongate skewer wrapped with a bark-colored paper strip and having a sharpened end. A sprig of artificial leaves protrudes from the stalk. The head portion includes a strawberry covered with a hardened meltable confection, which may have various edible enhancements adhered thereto. A plurality of such strawberry roses are bound into an arrangement along with artificial fern fronds and baby's breath, all wrapped loosely in tissue paper and fitted into a display box having a glassine window in its cover.

9 Claims, 5 Drawing Sheets

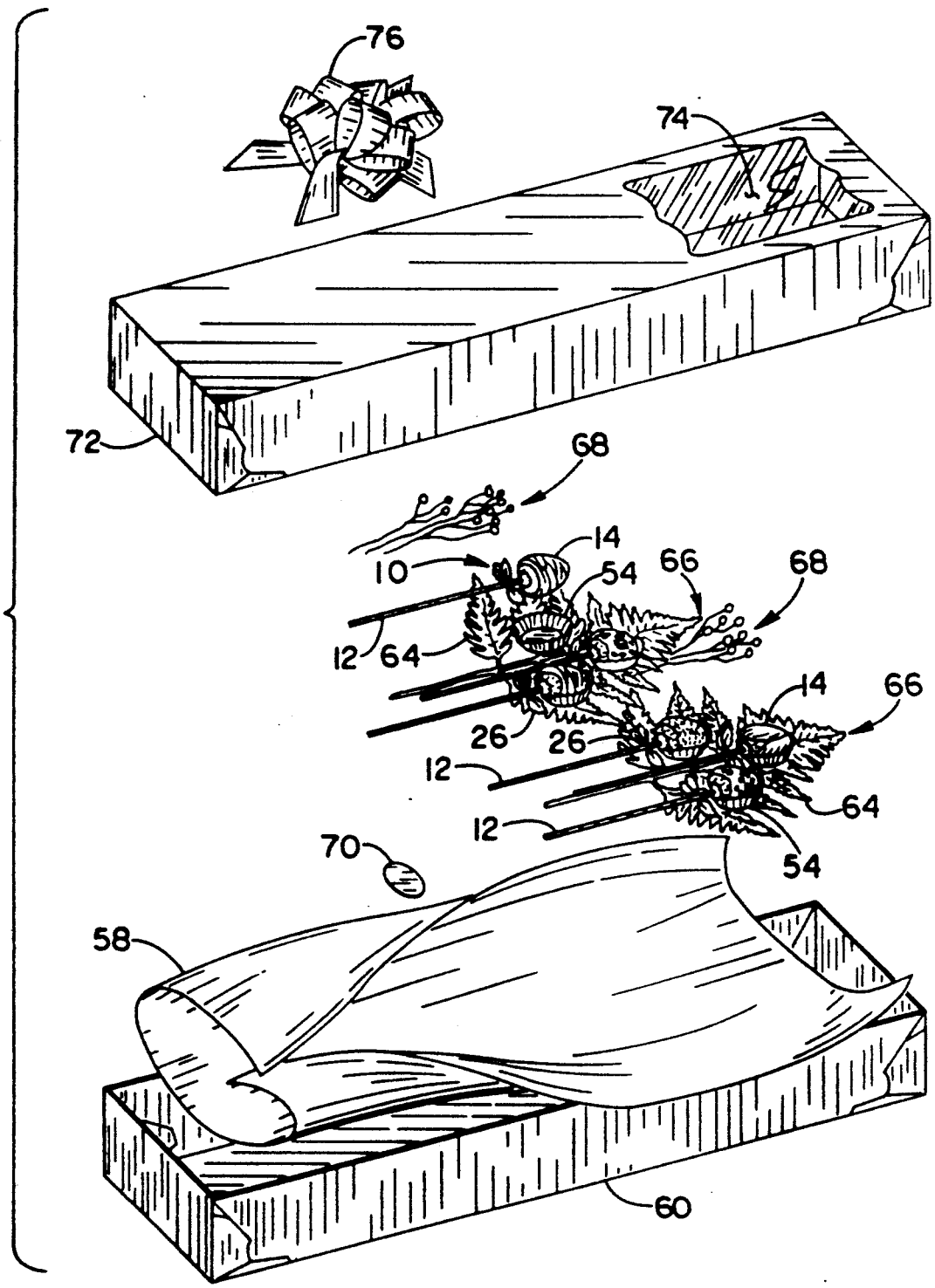
FIG.—3

STRAWBERRY SIMULATING A ROSE BUD

BACKGROUND OF THE INVENTION

1. Field Of The Invention

The present invention relates generally to the combined arts of fresh fruit confections and artificial floral constructions, and more specifically to fresh fruit transformed to appear to be a flower.

2. Description Of The Related Art

Confectionery is manufactured in an ever-widening variety of configurations in order to meet market demands for new and unusual products. Floral designs have, in the past, been employed in creating visual impressions in the confectionery arts, although these normally constitute vague impressions of plant anatomy. Examples include leaf shapes of candy including spearmint leaves and maple leaves.

Attempts have also been made to create the impression of a floral bouquet, such as is shown in U.S. Pat. No. 1,238,110 issued to Coolidge in 1917. Coolidge discloses a bouquet of gauze-wrapped hard candies arranged as a bouquet along with sprigs of foliage. And, U.S. Pat. No. 1,468,743 issued to Porter in 1923 discloses gum drop candies arranged with foliage in a flower pot to suggest the appearance of a potted plant. However, neither Coolidge nor Porter create a a very strong visual impression of an individual long-stemmed flower. Neither do they create a strong impression of an arrangement or bouquet of natural flowers. Further, the primary component of the bouquets of Coolidge and Porter is manufactured candy. Thus, it is unlikely that an outstanding fragrance is emitted thereby.

Thus, it appears that a novel sensual impression may be created, and an aesthetic need may be fulfilled, by construction of an artificial long-stemmed flower including fresh fruit.

SUMMARY OF THE INVENTION

The strawberry rose of the present invention is adapted to create a novel and inventive impression on the eye, and to act as a unique gift. In its essence, the invention comprises a stalk portion formed of a rigid supporting member with a sprig of leaves projecting therefrom, and a head portion formed of strawberry having a petal-like confectionery coating. An end of the stalk portion is driven securely into the strawberry so as to suggest the shape of a long-stemmed natural rose bud.

A plurality of such simulated rose buds may also be gathered into an arrangement to create the impression of a bouquet, or the like. This arrangement includes enhancing foliage interspersed among the simulated rose buds and floral paper wrapped partially therearound, all in a gift box having a glassine window in its top. The combination of the foregoing elements presents an authentic-appearance simulated floral arrangement whereby the foliage and the strawberries' complex natural scent of fresh greenery and sweet fruit cooperate with the strawberries' authentic floral appearance to create an olfactory as well as a visual impression that the arrangement is comprised of fresh, natural, long-stemmed rose buds. And, this results in a delightful, tasty gift which is convenient to enjoy simply by eating the confectionery-coated strawberry directly off its rigid supporting stalk.

Thus, an inventive and attractive gift item is disclosed and claimed herein, the objects and advantages of which will be apparent from the drawings and following detailed description thereof.

BRIEF DESCRIPTION OF THE DRAWINGS

FIG. 3 is an exploded perspective view of a plurality of strawberry roses as they are assembled into an arrangement in a gift box.

DESCRIPTION OF THE PREFERRED EMBODIMENT

Figure 1:
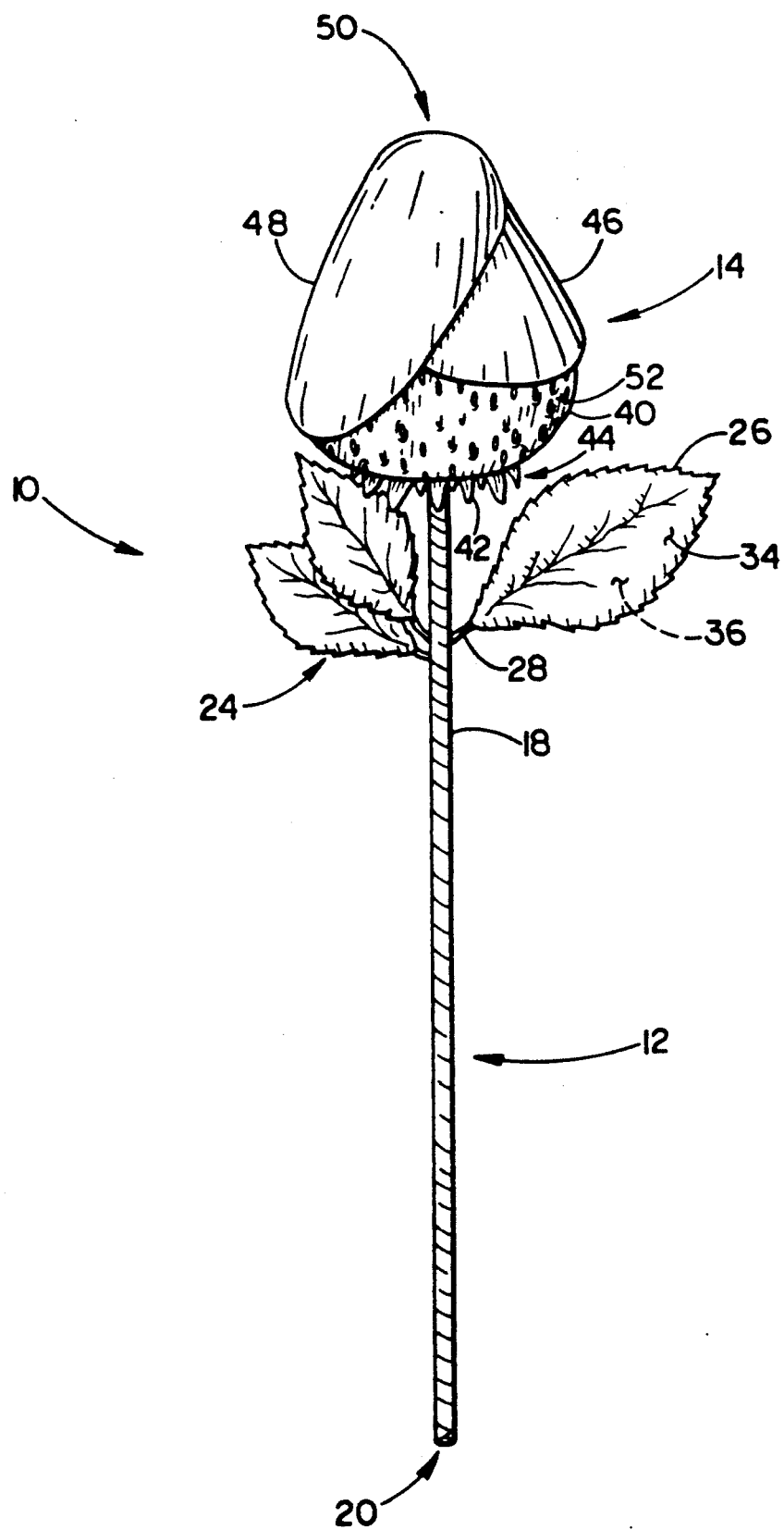
FIG. 1 is a front elevation of the strawberry rose of the present invention.

Referring now specifically to the drawings, FIG. 1 shows the inventive strawberry rose which is generally designated herein with the reference numeral 10. Strawberry rose 10 is comprised of stalk portion 12, which is an artificial facsimile of the stem and leaves of a natural rose. Strawberry rose 10 is further comprised of a head portion 14, which is a strawberry dressed in a confectionery coating such that the illusion of the strawberry being a natural long-stemmed rose bud, is created.

Figure 2C:
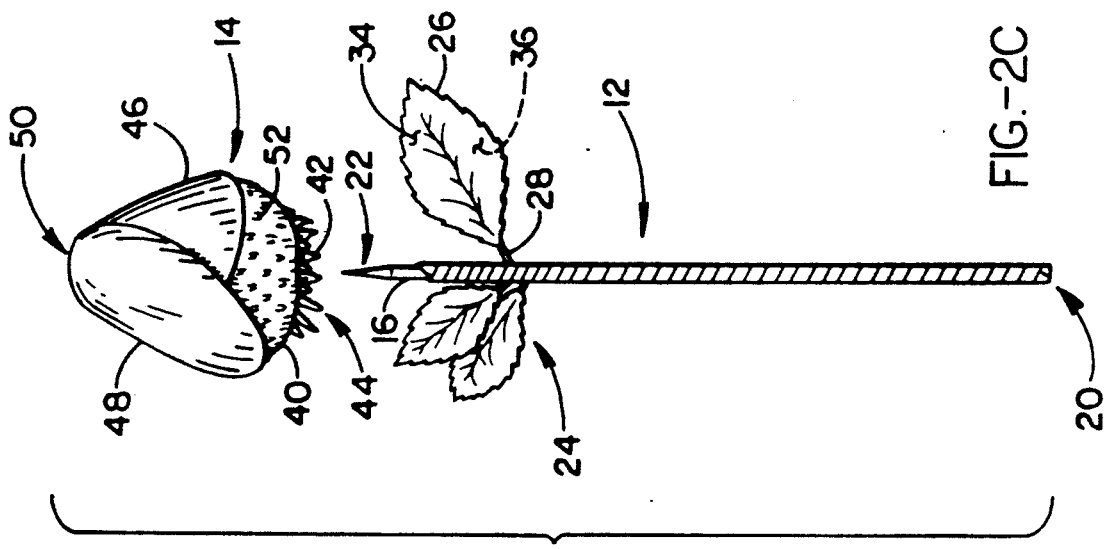
FIG. 2C is an exploded, front elevational view of the two main components of a strawberry rose, those being its stalk portion and its head portion.
Figure 2B:
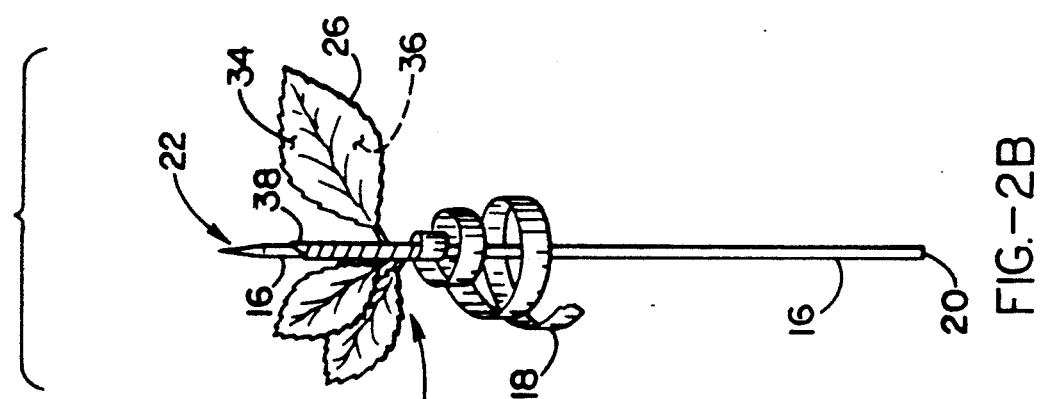
FIG. 2B is a front elevation of a later stage of a construction of a stalk, showing a sprig of leaves being wrapped to a skewer.
Figure 2A:
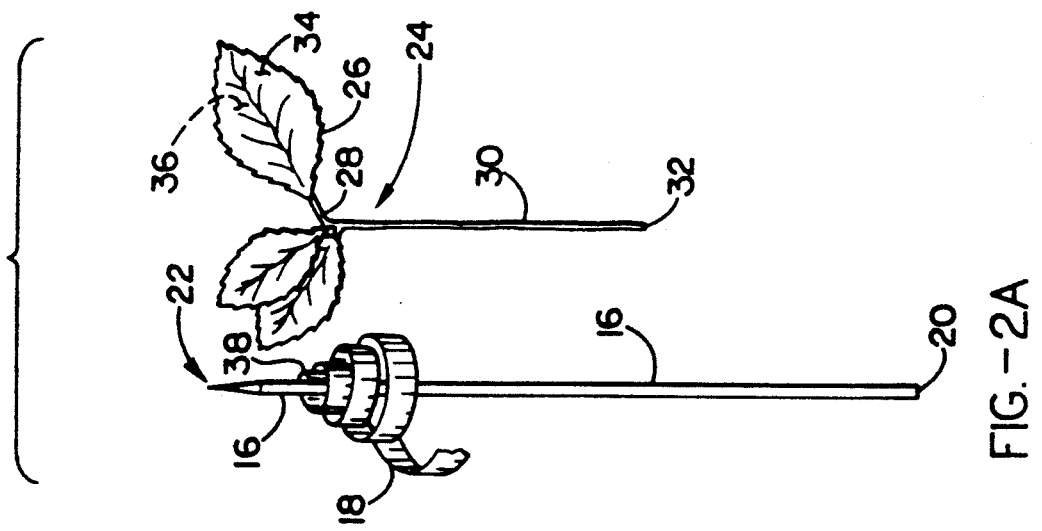
FIG. 2A is a front elevation of the first stage of construction of the stalk of a strawberry rose, showing a skewer being wrapped with floral tape.

As shown in FIGS. 2A, 2B and 2C, the primary structural element of stalk portion 12 is a thin, stiff, elongate skewer 16 which is sharpened to a point at one end. Skewer 16 is preferably comprised of wood, bamboo skewers 6-9" in length having been used with success in practicing the invention. Such skewers are those commonly known and used in the cooking arts for shishkabob. However, it is contemplated that other thin, stiff, elongate structural elements may work sufficiently well in constructing stalk portion 12. These may be of wood, plastic, metal or other materials. However, one should be mindful, in choosing such a structural element, that such element must be sanitary and otherwise suitable for use with food products. Bamboo shish-kabob skewers qualify in these respects.

FIGS. 2A, 2B and 2C show that skewer 16 is spirally wrapped in, and substantially covered with, a thin, flexible strip 18. The wrapping covers the blunt end 20 of skewer 16, but does not cover a portion just short of skewer 16's sharpened end 22. That is, the bare wood of sharpened end 22 remains exposed.

Strip 18 is comprised of adhesive-backed colored paper and is preferably brownish-green in color to mimic the appearance of a natural rose's stem. Strip 18 may also be slightly textured to mimic the roughness of a stem's bark. For best results and ease of use, it is preferred that strip 18 be approximately 0.5" in width. Such paper strips are commonly known in the flower arranging arts as "floral tape." Floral tape is readily available in 180" rolls through established sources of supply to the florist industry. One company that produces floral tape satisfactory for use herein is Floral Products Company, of Greenwich, Ct.

As is also shown in FIGS. 2A, 2B and 2C, strip 18 is used to bind a sprig 24 of artificial leaves to skewer 16 in a manner that enhances the suggestion that stalk portion 12 is a natural rose stem. As shown herein, sprig 24 includes three common artificial foliage leaves 26. Such leaves, although often misdescribed as being "silk," are more commonly constructed of polyester material. Leaves 26 are individually supported by semi-rigid, simulated petioles, or leaf stems 28, which are comprised of wire strands coated and colored to mimic natural leaf stems. Leaf stems 28 are, in turn supported by an elongate, primary stem 30 which is constructed of materials similar to those used in constructing leaf stems 28. To permit leaf stems 28 and primary stem 30 to hold a given shape once bent, it is preferred that the wire support therein be copper, or the like.

Leaves 26 preferably have a dark green color to mimic the color of natural rose leaves. It is contemplated that sprig 24 may have a fewer or greater number of leaves 26, and that a plurality of sprigs of such leaves may be used in creating the desired effect. Leaves 26 of approximately 1-2" in length and 0.5 and 1" in width have been found to yield the proper balance of dimension with respect to the other components of the finished strawberry rose product herein. Sprigs 24 including such leaves preferably have a primary stem of, roughly, 3-4", or so, in length in order to provide that an ample portion of same is available for wrapping securely to stalk 16 beneath strip 18, while permitting the remaining portion to project outward as best shown in FIGS. 1 and 2C.

To assure correct orientation of sprig 24 in the finished strawberry rose product 10, it is important that primary stem 30 be wrapped to lie parallel to the axis of skewer 16. Further, primary stem 30's lower end 32 should be oriented toward skewer 16's blunt end 20, and leaves 26 should be oriented toward the skewer's sharpened end 22. Thus, when stalk portion 12 is viewed in side elevation with its sharpened end up, as in FIG. 2C, the superior faces 34 of leaves 26 are oriented upward, and the nether faces 36 of the leaves are oriented downward.

To further enhance the natural appearance of stalk portion 12 in wrapping strip 18 around skewer 16, it is preferred that wrapping be carried out in a particular direction; i.e., strip 18's lead end 38 should be affixed adjacent skewer 16's sharpened end 22 (leaving the sharpened part of end 22 exposed) and then strip 18 should be wrapped from that starting point toward blunt end 22. As strip 18 is wrapped toward blunt end 22, primary stem of sprig 24 is laid against skewer 16 and bound thereto. Wrapping in this direction, from the sharpened to the blunt end, provides the best coverage of stalk 16 where primary stem 30 emerges from beneath paper strip 18. That is, wrapping in the preferred direction helps assure that little, if any, portion of the wooden surface of skewer 16 remains exposed at the point where primary stem 30 emerges.

It should be noted that it is also possible to create the desired inventive visual impression herein by employing a natural rose stem including its leaves, and perhaps even its thorns. Such a stem would merely need to be sharpened at its upper end to have an appearance very similar to that of stalk portion 12's combined elements. However, the artificial stem herein is expected to be a more commercially viable product.

Head portion 14 of strawberry rose 10 is comprised primarily of a select, plump, ripe strawberry 40. The strawberry, in its several varieties, is the one fruit having a shape and smell that make it uniquely suited to the sensory suggestion of the head of a natural rose bud. The dimensions of strawberry 40 may vary, depending upon the size of the rose sought to be mimicked. However, to achieve a good overall balance of dimensions of the components in the finished strawberry rose product, when using the preferred elements of the stalk discussed above, a strawberry roughly 1.5" wide at its base and 2" in length may be expected to suffice. In any case, the largest strawberry available will be probably be preferred. Those varieties of strawberry commonly described in the trade as being "conical" or "long wedge-shaped" have been found to yield the best aesthetic affect, that being the illusion of a natural rose bud. Of course, "Grade A" or "extra fancy" strawberries should be used to achieve the highest product quality.

It should be noted that those who become skilled in the art will realize that other fruits, especially those having a generally globular shape, may also work satisfactorily in practicing this invention. Fresh, as well as dried and otherwise preserved fruits may suffice.

In preparing strawberry 40 for use, it should be cleaned and any residual remnant of a protruding stem (not shown) should be removed. However, it is preferred that strawberry 40's natural, original bracts 42 be left intact. Bracts 42 mimic the bracts at the base of a natural rose bud, and therefore contribute to the overall aesthetics of the finished strawberry rose product.

Once strawberry rose 40 is properly prepared, it is securely mated with stem portion 12 by driving the exposed, sharpened end 22 of skewer 16 into the stem end 44 of strawberry 40. Strawberry 40 is preferably impaled among its bracts 42. Once mated, stalk portion 12 and strawberry 40 preferably reside in a coaxial relation. Skewer 16's sharpened end 22 preferably enters the strawberry at a point generally central to stem end 44, that being the point from which its bracts radiate. Further, the most secure mating may be achieved by driving sharpened end 22 into the fibrous central pith from which strawberry 40's stem originally protruded. This secure mating is necessary in order to maintain the integrity of the product as further processing is carried out. Sharpened end 22 should be driven into the strawberry to a depth sufficient to bury any exposed wood surface of skewer 16's sharpened end 22, this to minimize any detraction from the appearance of the final product.

Once stalk portion 12 and strawberry 40 are securely mated, the strawberry is dipped in a confectionery coating to create the visual suggestion that head portion 14 is the bud of a long-stemmed rose. In one example of how such a visual suggestion may be created, a folded petal-like appearance is lent to the product's head portion 14 by applying partially overlapping layers of confectionery to the strawberry. In preparation for this step, a meltable candy product such as dark chocolate or white chocolate is utilized. This candy product preferably has such properties that it liquifies easily at low heat, that being roughly 115° F., or so. Further, it should solidify quickly into a smooth, glossy coating upon being returned to room temperature. Such meltable candy coating products are available from the Guittard Chocolate Company of Burlingame, Ca. Guittard's products identified as Chocolate Flavored A'-peels in the following varieties: Vanilla no. 9756, Light Chocolate no. 9757; and, Dark Chocolate 9760, have proved satisfactory in practicing the invention. However, it is expected that other candy products having similar properties may also work well for these purposes.

Continuing, the chosen candy product is placed in a heating vessel, and its temperature is raised to that temperature at which it liquifies. A microwave oven has proven most expedient for this heating purpose. Once the candy is liquified, strawberry 40, at room temperature, is taken up by grasping its securely mated stalk portion 12 at a point near where it protrudes from strawberry 40's stem end. The strawberry is then dipped in the liquified candy such that stalk portion 12 is, roughly, at a 30° angle, or so, to the surface of the liquified candy. This dipping angle serves to leave a first shell 46 of candy coating over a portion of the strawberry's surface once the strawberry is withdrawn from the liquified candy. The surface portion covered is preferably the size of one hemisphere, or so, of the strawberry. Further, the boundary line 48 of this first shell 46 preferably runs from a point lateral but generally adjacent to the strawberry's stem end 44, and across the strawberry's surface in a diagonal direction to cover its apex 50 opposite its stem end.

Following this application of first shell 46, stalk portion 12 and strawberry 40 are rotated 180° on their common axes and the strawberry is re-dipped, thereby creating a second candy shell 48. Second shell 48 should also cover the strawberry's apex, the final aesthetic result being an overlapping, petal-like appearance as best shown in FIGS. 1 and 2C. This petal-like appearance is enhanced, and the overall product is rendered more attractive, if candy shells of contrasting color are employed. For example, one shell may be of dark chocolate and the other of white chocolate or vanilla to achieve this effect. For further aesthetic effect, attention should also be paid to leaving a portion 52 of the strawberry's natural surface exposed. If the foregoing directions are followed, such an area will be exposed adjacent the strawberry's stem end 44; it will be bordered by the cleft between the two shells, and from beneath by the strawberry's bracts 42. Thus, the appearance of a contrasting-colored petal beneath overlapping petals is created.

The consecutive steps of applying first and second shell 46 and 48, respectively, may be carried out in fairly close succession, although sufficient time must be allowed for first shell 46 to set up, or harden, before the second is applied.

Once the candy coatings are applied, the completed head portion 14 is laid on waxed paper to set. Once set, this completed head portion 14 is laid into a crimped, glossy-finished paper shell 54; this shell serving to frame head portion 14 and to enhance the overall aesthetic properties of the finished product.

Dipping may also be carried out before mating strawberry 40 with stalk portion 12, although this presents a danger of marring the surface finish of the confectionery shells in securing head portion 14 to stalk portion 12. If this order of steps is nevertheless chosen, the head portion should be grasped and handled with paper shell 54, or with some other protective device.

Figure 4:
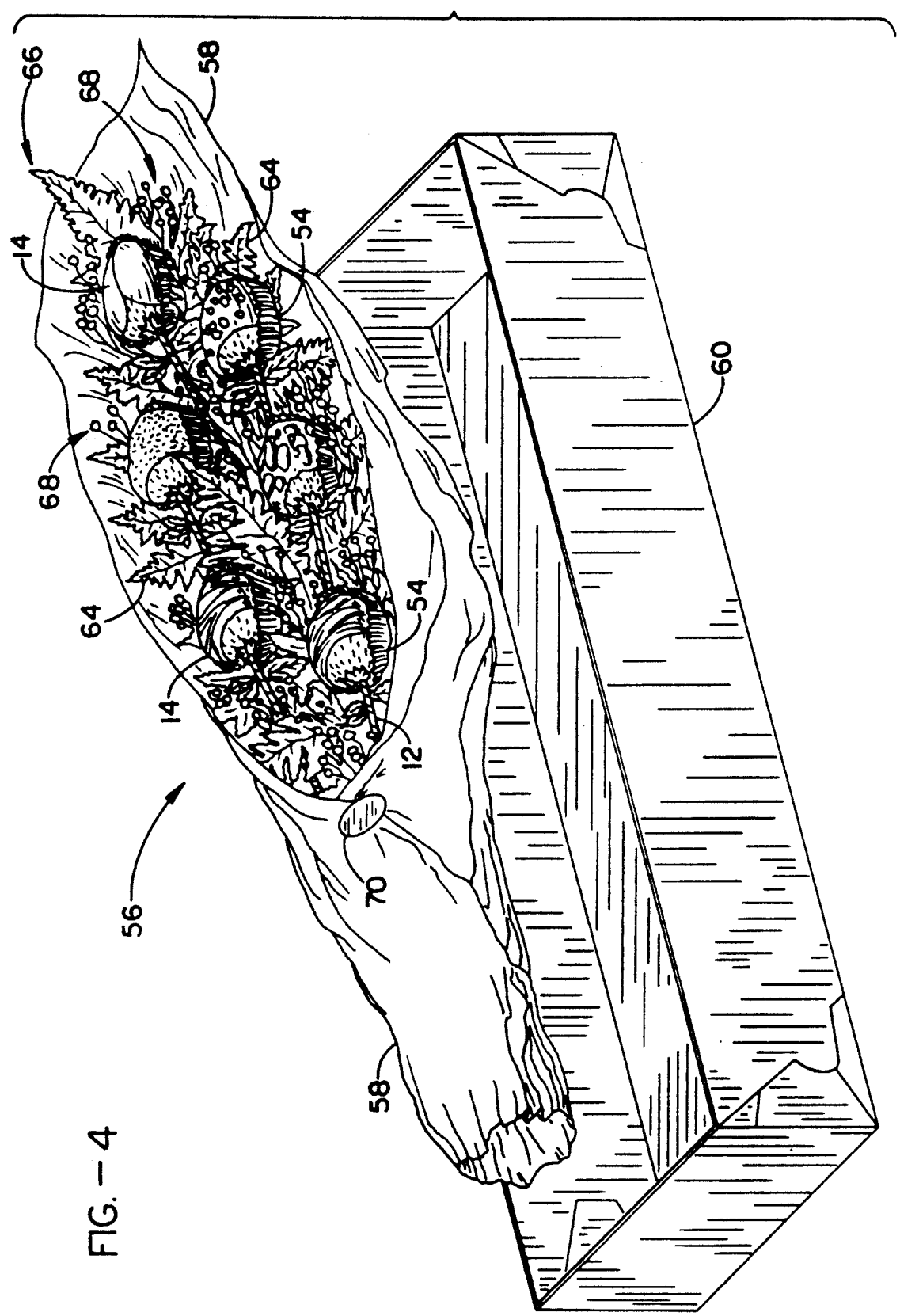
FIG. 4 is an exploded perspective view of a completed arrangement of strawberry roses.
Figure 5:
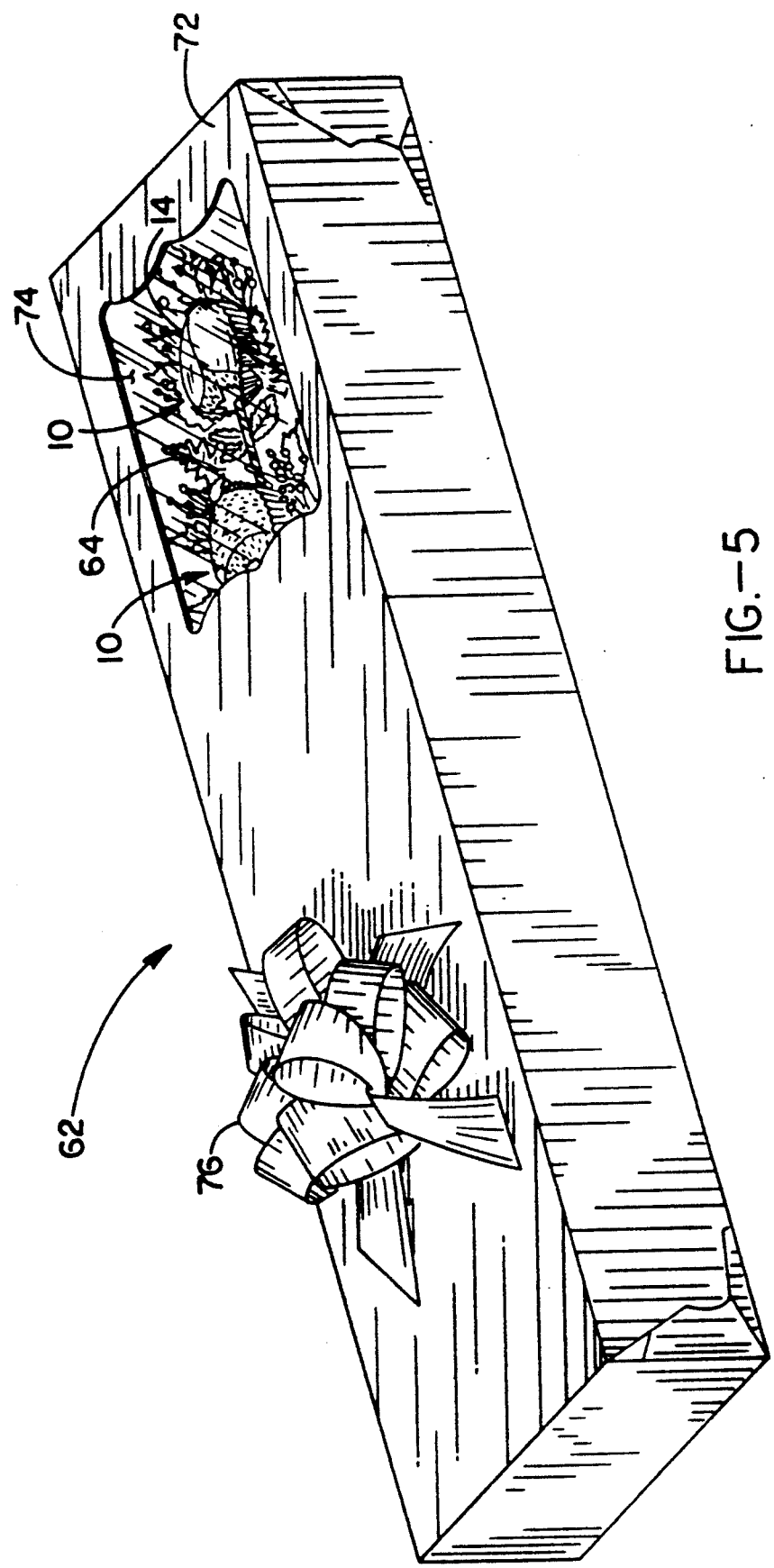
FIG. 5 is a perspective view of an arrangement of strawberry roses inside a gift box, the head portions of the strawberry roses being visible through the box's glassine window.

As head portion 14 of strawberry rose 10 will be set to rest in crimped paper shell 54 for final display, it is important that confectionery shells 46 and 48 be oriented such that their partial overlap will be best visible in plan view. Thus, first and second shells 46 and 48 should be applied at approximately 180° from one another; and, when placed on wax paper to set, the cleft between the shells, and the exposed portion 52 of the strawberry, should all be oriented facing upward. This is best shown in FIGS. 3, 4 and 5, soon to be described.

As may be expected, many artistic variations on the above-described dipping process have been experimented with, and many more pleasing combinations are expected to be found. Even a shell or coating of a single type or color of confection, such as dark chocolate alone, spread over entire head portion 14, is very pleasing. Thus, it should be understood when head portion 14 is referred to herein, it includes the strawberry itself as well as any coatings thereon. For example, in FIGS. 3, 4 and 5, head portions 14 having many different types of coatings and enhancements, as described below, may be seen.

Further edible enhancements may be added to the surface of head portion 14 by adherence thereto before setting up of the melted coating is complete. Some edible enhancements used with success include shredded coconut, chocolate chips and crushed or slivered nuts. Decorative striping patterns may also be drizzled over the surface of the shells, much in the fashion as is commonly used to cover confections known as "truffles," and the like. Such enhancements are suggested in FIGS. 3, 4, and 5, but are unnumbered for simplicity. As can bee seen in those figures, stippled and variegated patterns mimicking those of exotic varieties of natural roses or creating even more fanciful impressions on the eye, may be used.

A plurality of the above-described strawberry rose units may be gathered into a bouquet-like cluster or bundle, this serving to enhance the visual suggestion that they are natural rose buds. Such a cluster or bundle will be referred to herein as an "arrangement" and will be generally identified by reference numeral 56. Simulated floral arrangement 56 is constructed by first tucking a sheet of floral arrangement-type tissue paper 58 into the bottom half 60 of a floral gift box 62. Tissue paper 58 is preferably green in color, as is fairly standard in the flower arranging arts.

As is also known in the flower arranging arts, a bouquet or arrangement is made most appealing by the judicious addition of enhancing foliage thereto. This technique also works well in the practice of the instant invention. Such enhancing foliage may include ferns or other broad leaves, sprigs of petite background flowers, and the like. These may be natural or artificial, and are preferably interspersed among strawberry roses 10.

Construction of an arrangement of, for example, a half dozen strawberry roses begins by placing a dark green artificial fern frond 64 inside one end of box bottom 60. Box bottom 60 is sized for fitting an arrangement therein.

Ferns 64 constructed of polyester leaflets supported by coated wire stems, and having dimensions of roughly 9–10" across the widest part of the generally triangular frond and roughly 9–10" along its length have been found to work well with the dimensions of the cooperating elements herein. Such ferns 64 are readily available through established sources of supply to the florist industry.

A first strawberry rose 10 is placed atop fern frond 64 with head portion 14 in crimped paper shell 54 being positioned at the fern's center and near its uppermost tip 66. The head portion of a second strawberry rose is then laid a short distance to the right and somewhat lower, or further from the fern's tip, than the first. The third is to the left and lower still. Then, a second fern is laid on so its central tip 66 is between the head portions of the second and third strawberry roses. The heads of the fourth, fifth and sixth strawberry roses are staggered side-to-side farther downward along the second fern frond.

A few fresh sprigs of petite, white, background flowers called "baby's breath" 68 are added for color contrast and to enhance the visual suggestion that the arrangement is comprised of natural flowers. However, baby's breath 68 should not touch head portions 14 because this may promote spoilage. In lieu of this, an artificial substitute for baby's breath, having a similar appearance, may be employed.

Once this bundle of strawberry roses 10, fern fronds 64 and baby's breath 68 is complete, tissue paper 58 is wrapped loosely therearound, so as to partially surround the stalk portions 12 of the strawberry roses. Paper 58 may be sealed in place as by an attractive adhesive medallion 70, or the like.

To add the final touch to the visual impression that arrangement 56 is a conventional bouquet of rose buds, box top 72, having a glassine window 74 incorporated into its surface, is fitted over box bottom 60 and arrangement 56 therewithin. Of course, care should be taken to assure that window 74 is oriented in the proper direction to display the head portions of the strawberry roses. Finally, an adornment such as a bow 76 may be added to complete the appearance of a gift package.

Once arrangement 56 is complete, it will be found that the combination of colors used, along with the sweet smell of fresh strawberries, the confectionery coatings and the natural floral scent of baby's breath all combine to create the olfactory and visual impression of a fresh bouquet of rose buds.

The foregoing detailed disclosure of the inventive strawberry rose 10 is considered as only illustrative of the preferred embodiment of, and not a limitation upon the scope of, the invention. Those skilled in the art will envision many other possible variations of the structure disclosed herein that nevertheless fall within the scope of the following claims. For example, miniature bouquets may be fashioned using petite strawberries. Accordingly, the scope of the invention should be determined with reference to the appended claims, and not by the examples which have herein been given.

I claim:

1. A simulated long-stemmed rose bud, comprising:
   a. a thin, elongate, rigid bamboo skewer having a sharpened end;
   b. at least one simulated leaf, said leaf having a semi-rigid stem portion projecting from its base;
   c. a stem-colored flexible strip wrapped around and substantially covering said skewer except for a portion remaining exposed just short of said skewer's sharpened end, said strip also binding said simulated leaf's stem to said skewer;
   d. a strawberry bearing its natural bracts surrounding its stem end, said strawberry having said skewer's exposed, sharpened and portion driven securely into said strawberry's fibrous central pith among said bracts, such that said skewer's stem-colored wrapping meets said strawberry's stem and thereby concealing any exposed wood of said skewer and providing a secure mating of said strawberry to said wrapped skewer; and
   e. a hardened, meltable candy coating over a portion of said strawberry including the apex of said strawberry opposite said stem end, said coating comprising partially overlapping layers of said candy forming partially overlapped candy shells, the boundary line between the overlap of said shells running diagonally across said strawberry, said shells being positioned and colored, in combination with a remaining uncoated portion of said strawberry at said strawberry's pith and, to be sufficient to impart a folded, petal-like appearance to said strawberry, and further, in combination, with said wrapped skewer, to simulate a long-stemmed rose bud.

2. The simulated long-stemmed rose bud of claim 1 wherein at least one of said candy shells has a boundary line disposed at roughly 30 degrees to a common axis of said strawberry and said skewer.

3. The simulated long-stemmed rose bud of claim 1, wherein said coating comprises two candy shells disposed at approximately 180 degrees to one-another.

4. The simulated long-stemmed rose bud of claim 1, further including a crimped paper shell wherein said candy-coated strawberry rests.

5. A plurality of said simulated long-stemmed rose buds as in claim 1, each said rose bud being disposed in a generally horizontal posture, and further comprising:
   a. enhancing foliage interspersed among said simulated rose buds which, together therewith, yields a simulated floral arrangement;
   b. floral paper wrapped partially around said simulated arrangement; and
   c. a gift box fitted to contain said arrangement, said gift box having a glassine window incorporated into its top, thereby presenting an authentic-appearing simulated floral arrangement such that, when said gift box is opened, said natural foliage and strawberries' natural smell cooperates with said strawberries' authentic floral appearance to create an olfactory as well as a visual impression that said arrangement is comprised of fresh, natural rose buds.

6. The simulated long-stemmed rose bud floral arrangement of claim 5, wherein at least one of said rose buds' candy shells has a boundary line disposed at roughly 30 degrees to a common axis of said strawberry and said skewer.

7. The simulated long-stemmed rose bud floral arrangement of claim 5, wherein at least one of said rose buds' coating comprises two candy shells disposed at approximately 180 degrees to one-another.

8. The simulated long-stemmed rose bud floral arrangement of claim 5, wherein each said candy-coated strawberry rests in a crimped paper shell.

9. The simulated long-stemmed rose bud floral arrangement of claim 5, wherein at least one of said rose buds' coating comprises overlapping, petal-like candy shells and at least one other of said rose buds' coating comprises edible enhancements adhered to said coating, thereby creating a visual impression to a mixed bouquet of natural rose buds.

* * * * *